Figure 1:
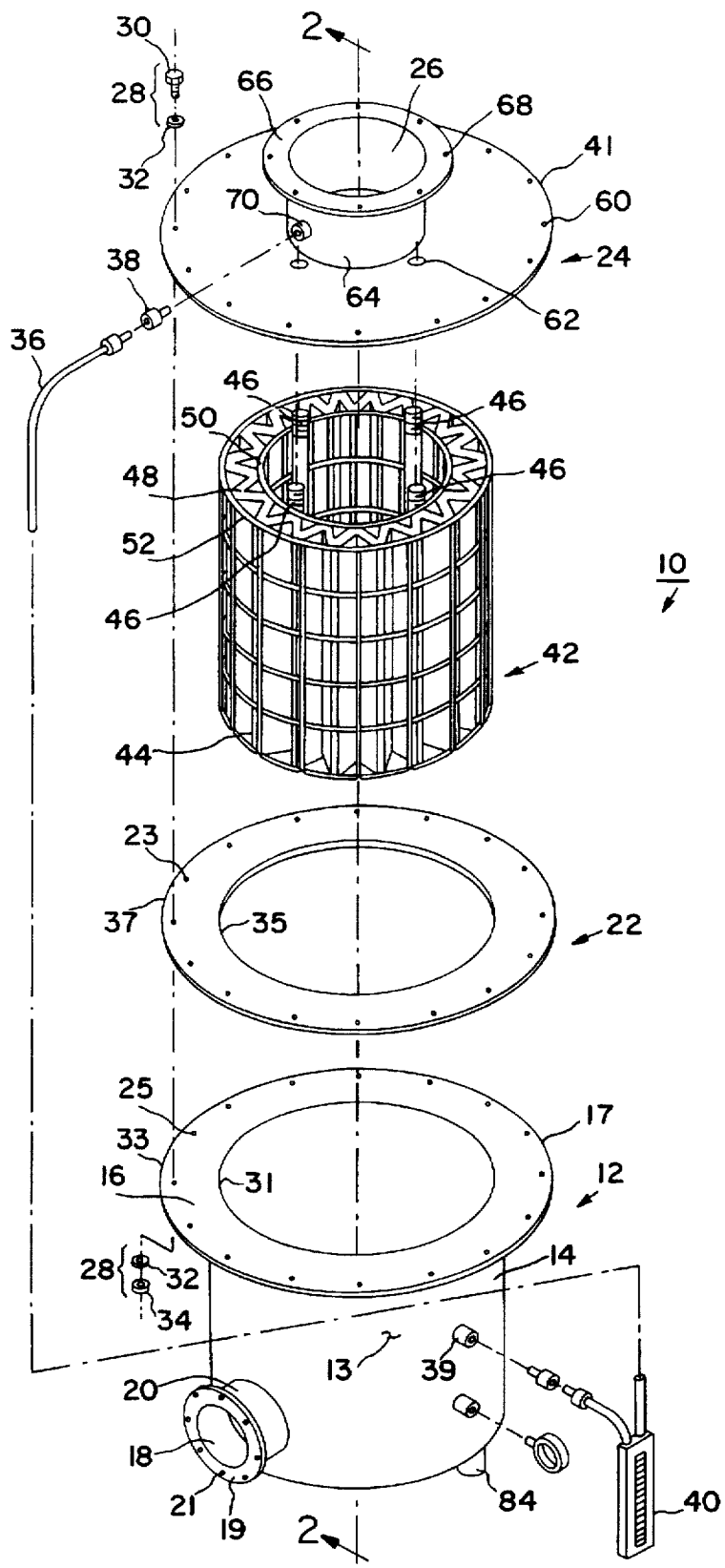

United States Patent [19]

Taub

[11] Patent Number: 5,795,369
[45] Date of Patent: Aug. 18, 1998

[54] FLUTED FILTER MEDIA FOR A FIBER BED MIST ELIMINATOR

[75] Inventor: Steven L. Taub, Narberth, Pa.

[73] Assignee: Ceco Filters, Inc., Conshohocken, Pa.

[21] Appl. No.: 611,698

[22] Filed: Mar. 6, 1996

[51] Int. Cl.$^6$ .......................... B01D 46/24; B01D 39/20
[52] U.S. Cl. .................... 95/273; 95/286; 55/341.1; 55/350.1; 55/484; 55/498; 55/521; 55/527
[58] Field of Search .................... 95/202, 214, 273, 95/286; 55/257.1, 259, 324, 341.1, 341.2, 350.1, 421, 424, 484, 497, 498, 502, 504, 505, 507, 511, 515, 516, 521, 527, 528

[56] References Cited

U.S. PATENT DOCUMENTS

| | | | |
|---|---|---|---|
| 1,915,987 | 6/1933 | Fisher et al. | 95/214 |
| 2,590,798 | 3/1952 | Guilleminot et al. | 65/254 |
| 2,724,214 | 11/1955 | Guilleminot et al. | 65/254 X |
| 2,745,513 | 5/1956 | Massey | 55/484 X |
| 2,771,153 | 11/1956 | Hennig . | |
| 3,093,469 | 6/1963 | Woolston et al. | 55/324 |
| 3,197,946 | 8/1965 | Taylor | 95/273 |
| 3,201,924 | 8/1965 | Fulford et al. | 55/498 X |
| 3,228,174 | 1/1966 | Perry, Jr. | 95/273 X |
| 3,301,650 | 1/1967 | Ward | 65/95 |
| 3,307,335 | 3/1967 | Shomaker | 55/267 |
| 3,347,026 | 10/1967 | Zankey | 55/484 X |
| 3,389,031 | 6/1968 | Rosaen et al. | 156/74 |
| 3,465,413 | 9/1969 | Rosaen et al. | 210/493.1 X |
| 3,488,928 | 1/1970 | Tarala | 55/498 X |
| 3,540,190 | 11/1970 | Brink, Jr. | 55/97 |
| 3,606,737 | 9/1971 | Lefevre | 55/319 |
| 3,802,160 | 4/1974 | Foltz | 95/273 |
| 3,887,665 | 6/1975 | Mix et al. | 55/259 X |
| 4,007,026 | 2/1977 | Groh | 55/341 X |
| 4,022,593 | 5/1977 | Lerner | 95/214 X |
| 4,105,723 | 8/1978 | Mix | 55/259 X |
| 4,130,487 | 12/1978 | Hunter et al. | 55/521 X |
| 4,132,761 | 1/1979 | Mix | 95/214 X |
| 4,155,726 | 5/1979 | Steinmeyer | 55/259 X |
| 4,221,770 | 9/1980 | Chapman | 95/214 X |
| 4,247,315 | 1/1981 | Neümann | 55/350.1 |
| 4,249,918 | 2/1981 | Argo et al. | 95/273 |
| 4,334,900 | 6/1982 | Neumann | 55/350.1 |
| 4,385,913 | 5/1983 | Lane | 55/350 |
| 4,514,875 | 5/1985 | Comer | 55/484 X |
| 4,516,994 | 5/1985 | Kocher | 55/498 X |
| 4,521,232 | 6/1985 | Howeth | 55/350.1 X |
| 4,589,983 | 5/1986 | Wydevan | 210/317 |
| 4,687,579 | 8/1987 | Bergman | 55/521 X |
| 4,734,195 | 3/1988 | Lhuillier et al. | 210/493.1 |
| 4,744,806 | 5/1988 | Ozolins et al. | 95/273 |
| 4,818,257 | 4/1989 | Kenedy et al. | 55/525 X |
| 4,838,903 | 6/1989 | Thomaides et al. | 55/480 X |
| 4,877,521 | 10/1989 | Petrucci et al. | 55/484 X |
| 4,878,929 | 11/1989 | Tofsland et al. | 55/498 X |
| 4,915,714 | 4/1990 | Teague et al. | 55/484 X |
| 4,948,398 | 8/1990 | Thomaides et al. | 55/484 X |
| 4,976,758 | 12/1990 | Yen | 55/350.1 |
| 4,976,759 | 12/1990 | Foltz | 55/498 X |
| 5,045,094 | 9/1991 | Paranjpe | 95/273 |
| 5,084,178 | 1/1992 | Miller et al. | 55/521 X |
| 5,306,332 | 4/1994 | Allen | 95/273 |
| 5,421,846 | 6/1995 | Klimczak | 55/502 X |
| 5,454,858 | 10/1995 | Tokar et al. | 55/498 X |

FOREIGN PATENT DOCUMENTS

| | | | |
|---|---|---|---|
| 564 265 | 11/1932 | Germany | 55/484 |
| 718134 | 2/1980 | Russian Federation | 55/484 |
| 837360 | 7/1981 | Russian Federation | 55/484 |
| 1 484 669 | 9/1977 | United Kingdom . | |
| 2 298 591 | 9/1996 | United Kingdom . | |
| WO95/03115 A1 | 2/1995 | WIPO . | |

*Primary Examiner*—Robert Spitzer
*Attorney, Agent, or Firm*—Seidel Gonda Lavorgna & Monaco, PC

[57] ABSTRACT

The present invention is directed to a fiber bed mist eliminator system useful for the removal of aerosols of less than 3 microns from a moving gas stream. The fiber bed mist eliminator system includes an enclosed filter vessel having an inlet and an outlet. A fluted filter media is provided in the filter vessel for the removal of the aerosols from the moving gas stream.

47 Claims, 6 Drawing Sheets

5,795,369

1

FLUTED FILTER MEDIA FOR A FIBER BED MIST ELIMINATOR

FIELD OF THE INVENTION

This invention relates to an improved fiber bed mist eliminator and process for the separation of aerosols from gas streams. More particularly, it relates to a fiber bed mist eliminator wherein the filtering media is fluted.

BACKGROUND OF THE INVENTION

Fiber bed mist eliminators are commonly used to remove fine particles from a gas stream passing therethrough. The particles may be either solid or liquid. The term aerosol refers to a suspended particle, either solid or liquid, which is slow to settle by gravity and having a diameter ranging from sub-micron up to 10 microns, more commonly up to 3 microns.

A liquid-gas dispersion, such as an aerosol, may intentionally or unintentionally develop in a two phase (liquid-gas) environment. For instance, gases and liquids may be contacted in absorption or distillation operations resulting in a two phase liquid-gas stream. It is usually desirable for environmental or economic reasons to separate the liquid-gas stream into separate gas and liquid components. Many devices have been developed to facilitate this separation process. One such device is the fiber bed mist eliminator.

Many industrial facilities have a multitude of process systems which generate waste gas streams containing aerosols. Typically, conduits are provided throughout these facilities to carry the aerosol-laden air to a filtering system for treatment. These conduits may represent a safety hazard as a result of the aerosols being carried in the waste stream. The aerosols, as they travel through the conduits, also tend to contaminate the conduits by impacting the sides of the conduits. These contaminated conduits usually must be treated to remove the contaminants prior to opening, removing, or replacing such conduit sections.

The gas streams containing aerosols from each of these systems are usually directed into a central aerosol filtering system. The aerosol filtering system is likely to consist of a large vessel containing a plurality of fiber bed mist eliminators. The fiber bed mist eliminators within the vessel may be either single wall filters, multiple parallel filters, as described in U.S. Pat. No. 4,948,398, which is incorporated herein by reference, or multi-phase filters, as described in U.S. Pat. No. 4,838,903, which is also incorporated herein by reference. The aerosols are removed from the gas stream as the gas stream passes through a packed bed portion of the filters, thereby causing the aerosols to coalesce into large droplets. The droplets are then drawn downward by gravity into a drain.

Typical filtering systems employing fiber bed mist eliminators in a large common vessel suffer from some drawbacks, which are overcome by the present invention. As an example, in order to increase the effective surface area of a fiber bed filtering system, the height and/or diameter of the fiber bed may be increased. Height and weight limitations of the particular industrial facility may preclude increasing the height of a fiber bed beyond 30 feet or having a fiber beds with a diameter greater than 40 inches. Additionally, as each fiber bed is enlarged, the weight of the overall vessel is increased, which thereby dictates larger support structures.

The increased weight of a conventional fiber bed mist eliminator arises from the fact that the filtering media contained therein is essentially one cylindrical filter unit inserted into another filter unit. Each cylindrical filter unit of the dual filter device is enclosed in a metallic cage and supported on a flange. The resulting fiber bed mist eliminator may be rather heavy, which places constraints on the means for supporting the fiber bed mist eliminator employing a dual filter device. The present invention overcomes this problem.

There is a need for an aerosol filtering system capable of providing higher throughput to remove fine particles. However, the system must provide an increased filtering surface area within the height and weight limitations of standard industrial facilities.

Additionally, an aerosol filtering system is needed that reduces the distance that particle-laden air must travel to a treatment system and thereby reduce the length of contaminated conduit.

Additionally, a filtering system is needed wherein individual filters can be individually monitored, removed, repaired, and/or replaced.

SUMMARY OF THE INVENTION

An improved aerosol filtering system and process for removing aerosols is provided. In one embodiment, the invention is directed to a fiber bed mist eliminator system useful for the removal of aerosols of less than 3 microns from a moving gas stream. The fiber bed mist eliminator system includes an enclosed filter vessel having an inlet and an outlet. A fiber bed mist eliminator filter is located within the vessel. The fiber bed mist eliminator filter includes a fluted filter media comprising randomly-distributed fibers sandwiched between an outer cage and an inner cage. The fibers have a mean diameter in the range from about 2 microns to about 50 microns.

The fibers are selected from the group consisting of polymeric compounds, fiberglass, graphite, rayons, and mixtures thereof. The inner and outer cages are made from materials that are substantially inert to the gas stream and the aerosol entrained therein.

The fluted filter media has a plurality of flutes forming a continuous, substantially corrugated shape. Each flute defines an internal angle between about 15° and about 60°, more preferably, between about 25° and about 45°, most preferably, about 30°.

The present invention is also directed to a fiber bed mist eliminator system which includes at least two fiber bed mist eliminator filters positioned within a single housing. Each fiber bed mist eliminator filter includes a fluted filter media preferably contained within a support structure. The fluted media and/or support structure is mounted to the housing. Means are provided for channeling a portion of the liquid-entrained gas flow into each fiber bed mist eliminator filter for treating the gas stream. The treated gas streams combine within the housing after passing through the fluted filter media and are channeled out of the housing.

In an alternate embodiment, a fiber bed mist eliminator system includes at least two fiber bed mist eliminator assemblies mounted to a common drain sump. Each fiber bed mist eliminator assembly includes a fluted filter media contained within a support structure and housed within a separate housing. A portion of the contaminated flow is directed into each fiber bed mist eliminator assembly. The decontaminated fluid streams combine outside of the fiber bed mist eliminator housings after having passed through the fluted filter media.

The present invention is also directed to a process for the substantial removal of aerosols entrained in a moving gas stream. The process begins by introducing an aerosol-laden gas stream into a fiber bed mist eliminator filter. The aerosol-laden gas stream is passed through a fluted filter media in the fiber bed mist eliminator filter to form substantially aerosol-free gas stream. An alternative process begins by splitting an aerosol-laden gas stream into at least first and second gas stream segments. Each gas stream segment passes through a separate fiber bed mist eliminator filter having a fluted filter media to form substantially aerosol-free first and second gas stream segments. The fiber bed mist eliminator filters are contained within a common vessel. The substantially aerosol-free first and second gas stream segments are then removed from the vessel. In still a further embodiment, an aerosol-laden gas stream is divided into two streams. A first stream is passed through a first fiber bed mist eliminator assembly having a first fluted filter media contained within a first housing. A second gas stream is passed through a second fiber bed mist eliminator assembly having a second fluted filter media contained within a second housing. The resulting substantially aerosol-free gas streams are then channeled from the assemblies.

The flow rate of the aerosol-laden gas stream into the fiber bed mist eliminator(s) ranges from about 1 cubic foot per minute to about 500,000 cubic feet per minute, more preferably, from about 10 cubic foot per minute to about 100,000 cubic feet per minute.

The velocity at which the aerosol-laden gas stream passes through the fluted filter media is less than that which results in a substantial reentrainment of collected aerosols onto the gas stream from which the aerosols were removed, more preferably, from about 1 foot per minute to about 200 feet per minute.

For the purpose of illustrating the invention, the drawings illustrate presently preferred embodiments. It is understood, however, that the present invention is not limited to the precise arrangements and instrumentalities shown therein. A brief description of the drawings is as follows.

DESCRIPTION OF THE DRAWINGS

FIG. 1 is an exploded view of a fiber bed mist eliminator system which includes a fluted filter media contained within a housing according to one embodiment of the present invention.

FIG. 2 is a cross-sectional view of the fiber bed mist eliminator system taken along lines 2—2 in FIG. 1.

FIG. 3 is an enlarged partial top view of a section of the fluted filter media of a fiber bed mist eliminator filter.

FIG. 4 is a cross-sectional view of a second embodiment of the fiber bed mist eliminator system showing two fiber bed mist eliminator filters mounted within a common vessel.

FIG. 5 is a side view of another embodiment of a fiber bed mist eliminator system showing two fiber bed mist eliminator assemblies, each assembly having a separate housing containing a fluted filter media.

FIG. 6 is an isometric view of another embodiment of the fiber bed mist eliminator system showing a plurality of fiber mist eliminator assemblies mounted to a common drainage sump.

FIG. 7 is a cross-sectional view of the fiber bed mist eliminator system taken along lines 7—7 in FIG. 6.

FIG. 8 is a partial cross-sectional view of the fiber bed mist eliminator system taken along lines 8—8 in FIG. 6.

DESCRIPTION OF THE PREFERRED EMBODIMENTS

In many industrial situations, it is desirable to provide a filtering system capable of removing airborne particles. These particles may be either solid or liquid. Aerosols of this nature typically have a particle size of less than 10 microns, more commonly less than 3 microns. Fiber bed filtering systems are commonly used to remove aerosols from gas streams due to their high efficiency. Typically, a plurality of fiber bed filters are employed for this purpose within a common treatment vessel. A multitude of process gas streams containing aerosols are usually introduced into the common treatment vessel.

The present invention improves upon the conventional fiber mist eliminator systems by providing a more efficient fiber bed mist eliminator filter which includes a filter media (or fiber bed) contained within a support structure. In the present invention, the filter media is fluted to increase the effective surface area of the filter so as to result in increased efficiency of the fiber bed mist eliminator filter. The improved fiber bed mist eliminator filter is most advantageously positioned in the immediate vicinity of an aerosol generating source. A plurality of improved fiber bed mist eliminator filters may be provided throughout a facility, either individually or in a parallel configuration so as to define an overall fiber bed mist eliminator system.

In one fiber bed mist eliminator system embodiment, a plurality of fiber bed mist eliminator filters (i.e., fluted filter media and associated support structure) are individually housed and may be monitored, removed, or replaced without shutting down the entire filtering system. Additionally, the positioning of an individual fiber bed mist eliminator filter in the vicinity of an aerosol generating source allows an operator to identify the source of a process which may be producing particles that are clogging an aerosol filtering system. The localized positioning of the fiber bed mist eliminator filters also reduces the amount of conduit carrying aerosol-laden air. Various fiber bed mist eliminator system embodiments will be discussed in more detail below.

It may be appreciated that existing conventional straight wall filter media may be easily replaced by the improved fiber bed mist eliminator filters described herein with similar thickness and diameter to provide greater filter surface without the need for replacement of the filter housing.

For the sake of clarity, the combination of the fluted filter media and its associated support structure will be referred to as the fiber bed mist eliminator filter. The combination of the fiber bed mist eliminator filter (with or without the support structure) and the housing/vessel within which it is contained will be referred to as the fiber bed mist eliminator assembly. The overall system will be generally referred to as the fiber bed mist eliminator assembly. The untreated gas stream will be generally referred to as aerosol-laden gas stream or contaminated stream. The treated gas stream will be generally referred to as substantially aerosol-free gas stream or decontaminated stream. Those skilled in the art will readily appreciate and understand the language utilized throughout this specification.

Referring to FIG. 1, a fiber bed mist eliminator system is shown and includes a fiber bed mist eliminator assembly 10. The fiber bed mist eliminator assembly includes a filter housing 12, a gasket 22, a fiber bed mist eliminator filter 42, and a top plate 24. Filter housing 12 is a hollow vessel, preferably cylindrical, defined by a side plate 14, a bottom plate 15 (shown in FIG. 2), and a filter flange 17. The filter housing 12 is generally constructed of a material that is impervious to fluids and inert to the aerosols contained in the system. Examples of suitable materials are metals, plastics, or combinations thereof.

Side plate 14 is characterized by having an inner surface 11 (shown in FIG. 2) and an outer surface 13. Inner surface 11 and outer surface 13 define an inner circumference 27 and an outer circumference 29, respectively, (both shown in FIG. 2) of filter housing 12. Filter housing 12 further includes an inlet 18 defined by a conduit 20. Conduit 20 includes a flange 19 having a plurality of openings 21 for connecting a feedline (not shown) in known fashion to filter housing 12. Filter housing 12 still further includes a lower port 39 providing fluid communication between an interior region of filter housing 12 and a pressure indicator 40. The preferred method and equipment for monitoring the pressure and/or pressure drop through filtering housing 12 is described in greater detail below.

Filter flange 17 has an inner circumference 31 and an outer circumference 33. Filter flange 17 has a top surface 16, which radiates out from inner circumference 31 and beyond outer circumference 29 of filter housing 12. Filter flange 17 is oriented substantially perpendicular to side plate 14 of filter housing 12. Top surface 16 preferably has a width of between ½" and 2", more preferably about 1". Flange 17 has a thickness of between ⅛" to ¾", more preferably about ½", which is substantially the same thickness as side plate 14 and bottom plate 15. Filter flange 17 includes lower locking openings 25 that are spaced substantially equidistant around top surface 16 and through filter flange 17.

Gasket 22 has a generally circular shape with an inner circumference 35 and outer circumference 37. Inner circumference 35 of gasket 22 substantially corresponds with inner circumference 31 of filter housing 12. Outer circumference 37 of gasket 22 substantially corresponds with outer circumference 33 of top surface 16. Gasket 22 is provided with middle openings 23 that substantially correspond with lower locking openings 25 provided through filter flange 17. Gasket 22 is preferably prepared from a rubbery composition having sufficient flexibility, compressibility, and imperviousness to form an air and water (liquid and gas) tight seal between adjoining parts, such as filter housing 12 and top plate 24.

Fiber bed mist eliminator filter 42 includes a layer of fluted filter media 48 and a support structure. The support structure preferably includes an inner cage 50, and an outer cage 52. A base plate 44, and a plurality of upstanding rods 46 are preferably also included in the support structure. The support structure contains and supports the filter media 48. The characteristics of fluted filter media 48 will be described in more detail below.

Top plate 24 includes an outlet 26, a plurality of top locking openings 60, and a plurality of stabilizing openings 62. Top plate 24 has an outer circumference 41 that substantially corresponds with outer circumference 37 of gasket 22 and outer circumference 33 of top surface 16. Top locking openings 60 are provided substantially equidistant along outer circumference 41 of top plate 24 and substantially correspond with lower locking openings 25 of top surface 16 and middle openings 23 of gasket 22. Stabilizing openings 62 are located radially inward of top locking openings 60.

Outlet 26 of top plate 24 is defined by an upward section 64 and flange section 66. Flange section 66 is provided with openings 68 analogous to openings 21 of inlet 18. A port 70 is provided through upward section 64. Port 70 is designed to receive a connector 38, which is then optionally connected to a pressure line 36. Pressure line 36 may be connected to pressure indicator 40 in conventional fashion.

Pressure indicator 40 is of conventional construction and may be adapted to monitor the pressure in fiber bed mist eliminator assembly 10 or the pressure drop through fluted filter media 48. Preferably, the pressure drop through fluted filter media 48 is no greater than 30 inches of water column. More preferably, the pressure drop through fluted filter media 48 is between 2 inches and 20 inches of water column.

Fiber bed mist eliminator filter 42 may be enclosed in fiber bed mist eliminator assembly 10 by placing the fiber bed mist eliminator filter 42 in the filter housing 12 with base plate 44 resting on bottom plate 15 of filter housing 12. Gasket 22 is then placed on top surface 16 of filter flange 17 such that middle openings 23 correspond with lower locking openings 25 of filter flange 17. Top plate 24 is then placed on gasket 22 and top surface 16 such that top locking openings 60 correspond with middle openings 23 of gasket 22 and lower locking openings 25 of filter flange 17. Furthermore, upstanding rods 46 extend upward and through stabilizing openings 62. A portion of upstanding rods 46 extending above top plate 24 may be threaded to allow the addition of a fastener, such as an internally threaded bolt.

In order to securely close the fiber bed mist eliminator assembly 10, a plurality of locking assemblies 28, such as a threaded nut 30, a washer 32, and an internally threaded bolt 34, may be provided through top locking openings 60, middle openings 23, and lower locking openings 25 in known fashion. Threaded nut 30 may be freely removable from or affixed by welding or other well known mechanisms to filter vessel 10. Alternate mounting arrangements for attaching the various elements of the fiber bed mist eliminator assembly 10 are well known in the art and need not be described further.

Figure 2:
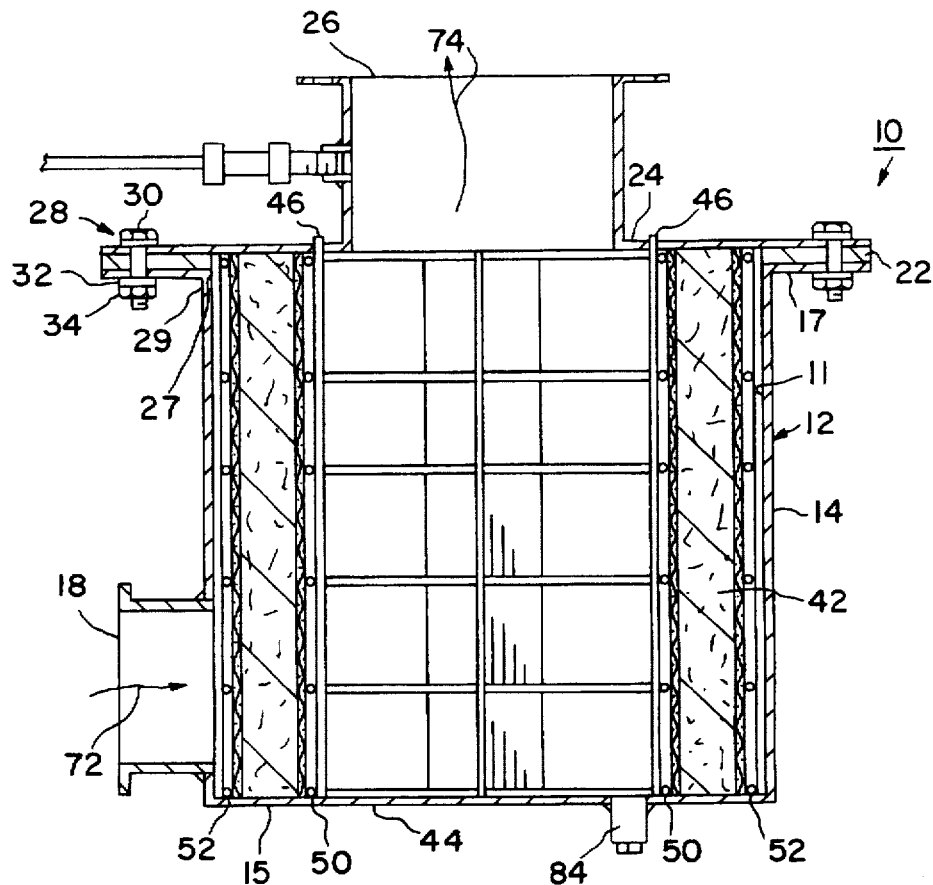

A cross-sectional view of an enclosed fiber bed mist eliminator assembly 10 is shown in FIG. 2. It can be seen that base plate 44 rests on bottom plate 15 and that top plate 24 is in abutting engagement with fiber bed mist eliminator filter 42. Accordingly, an aerosol-laden gas 72 entering filter vessel 10 through inlet 18 must pass through the fiber bed mist eliminator filter 42 prior to exiting the filter housing 12 through outlet 26 as a treated gas 74. This particular flow pattern is known in the industry as an "outside-in" flow. One skilled in the art will immediately recognize that the direction of flow of the gas stream may be reversed to produce an "inside-out" flow pattern. Either flow pattern may be used to practice the present invention for removing aerosols from a gas stream. As aerosol-laden gas 72 passes through the fiber bed mist eliminator filter 42, aerosols coalesce into liquid droplets which fall by gravity towards bottom plate 15. The resulting droplets are removed from filter housing 12 through a drain 84.

Figure 3:
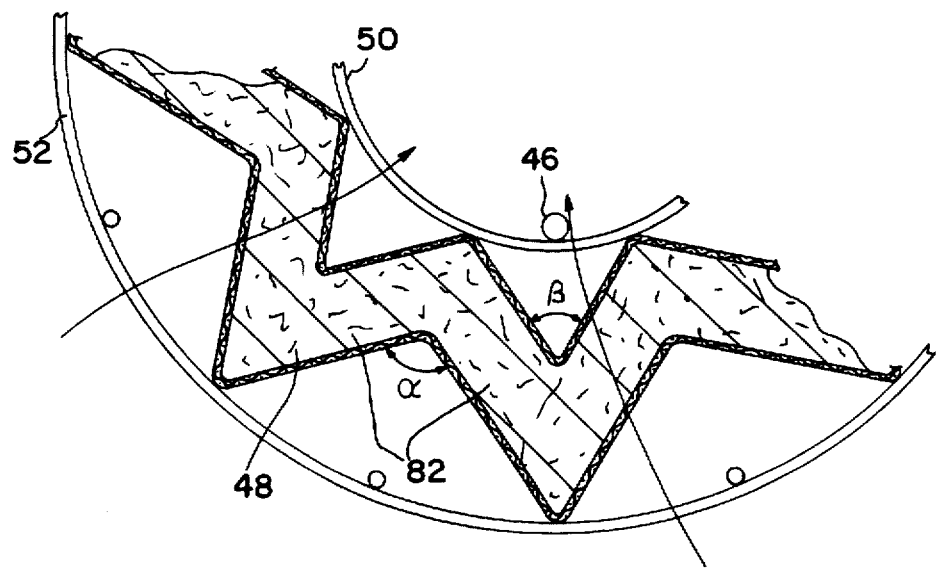
Figure 4:
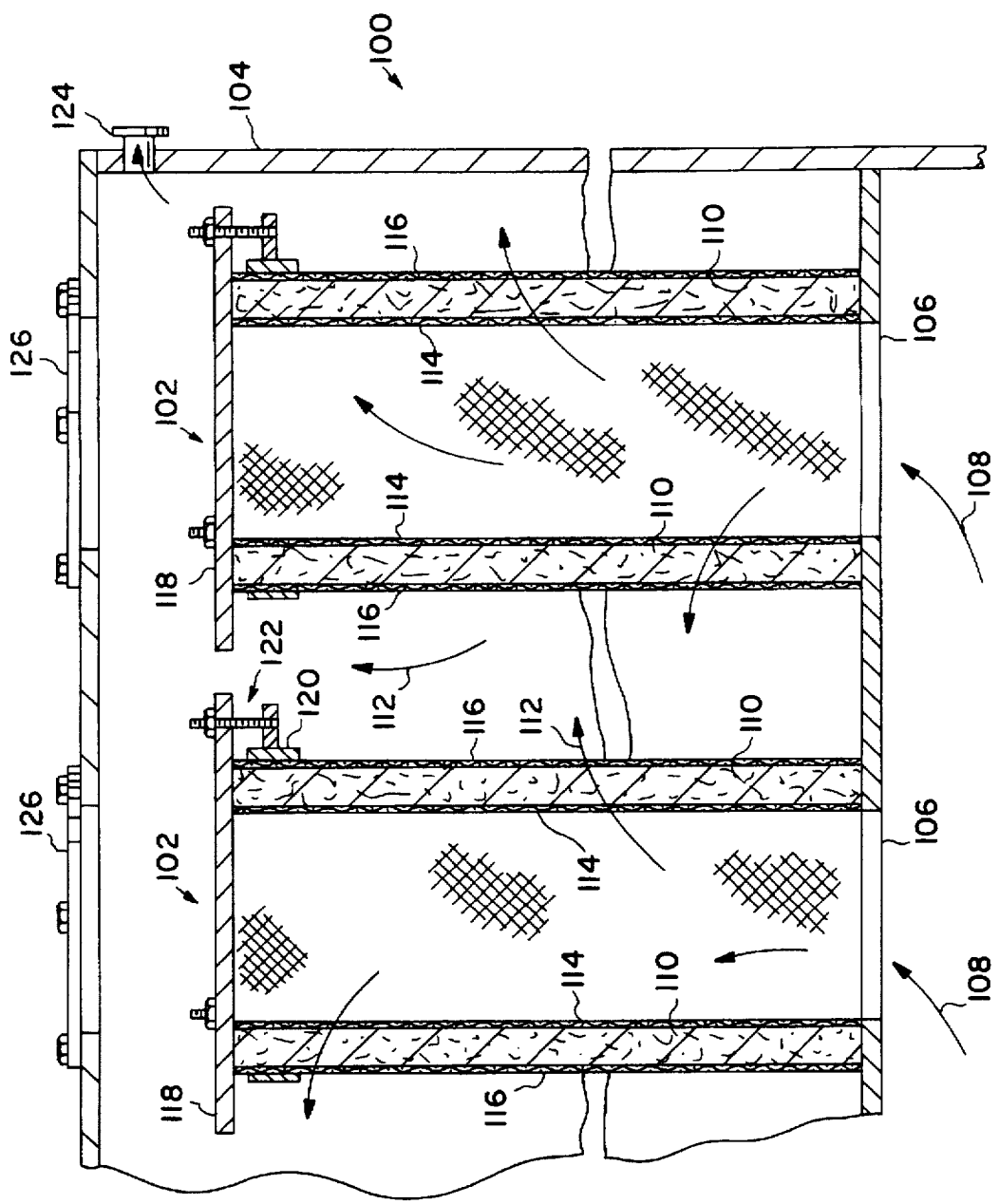

Although the fiber bed mist eliminator filter 42 illustrated in FIG. 1 is generally cylindrical, any desired cross-sectional configuration may be employed. An enlarged section of the fiber bed mist eliminator filter 42 is illustrated in FIG. 3. As stated above, the fiber bed mist eliminator filter 42 includes the layer of fluted filter media 48 which is supported by inner support cage 50 and outer support cage 52. The fluted filter media 48 has a substantially corrugated shape defined by a plurality of flutes or folds 82. Converging sides of adjacent flutes 82 define an external angle $\alpha$. Each flute 82 defines an internal angle $\beta$. In order to avoid plugging or flooding, internal angle $\beta$ is preferably between about 15° and 60°, more preferably between about 25° and 45°, most preferably about 30°. The radial distance between the inner and outer support cage is a function of the angles $\alpha$ and $\beta$, and the diameter and the thickness of the filter media 48. Typically, the radial distance may be about seven inches. It is also contemplated that the flutes of the filter media can be curved or arced with a desired radius. For example, the flutes can have a minor radius of between about 1/16" and about ¾". The major radius can be between about ½" and about 2". Preferably, the minor radius is about ⅛" and the major radius is about 1".

The fluted filter media 48 has a thickness of between about 1" to about 3", more preferably, about 2". A "fluted" filter media contrasts with a "pleated" filter media as it is known in the art in that a "pleated" filter media is typically less than ⅛" in thickness and designed for impaction collection, as opposed to deep bed filtration. This is a very important difference since "pleated" filter media are typically not designed to filter liquid from a passing gas stream but, instead, to filter out particulate matter. The small thickness of the "pleated" filters permits the filters to be prepared by folding or creasing the filter media. The "fluted" filter media 48 utilized in the present invention has a thickness of between about 1" to about 3". Since the flow velocity of the aerosol-laden gas stream is relatively low in a fiber bed mist eliminator system, the collection of the particles is generally governed by brownian movement. Hence, the increased thickness of the fiber bed is needed in order for the liquids/aerosols within the gas stream to coalesce into large droplets on and within the filter media. A filter media with this excessive thickness cannot be easily fabricated by folding or creasing the filter media. Rather, as described more fully below, the fluted filter media 48 is preferable prepared in a series of molding and/or annealing steps. A conventional pleated filter media would not work for practicing the present invention.

Each fluted filter media 48 comprises randomly distributed fibers having a mean diameter in the range from about 2 to about 50 microns. It is presently preferred that these fibers be packed to a density ranging from about 6 to about 22 pounds per cubic foot, preferably between about 12 to about 17 pounds per cubic foot. Suitable fiber material which can be employed when practicing the present invention include, but is not limited to, fibers of polymeric materials (e.g., polyesters, polyvinyl chloride, polyethylene, perfluoro polymers, perfluorochloro polymers, polyamides, such as Nylon 66 and Nylon 46, polypropylene, polytetrafluoroethane, polyphenylsulfide, acrylic acid polymers, and mixtures thereof), graphite, rayons, fiberglass, and mixtures thereof. It should be noted that fiberglass cannot be used in acidic conditions, such as aerosols containing hydrofluoric acid. Instead, polyester filter media should be used in environments containing hydrofluoric acid.

By incorporating flutes in the aforementioned filter media, it is possible to increase the surface area of the filter by about 60% or more. This greatly increases the filter media's ability to capture the entrained liquid.

The fiber bed mist eliminator filter 42 preferably sandwiches the fibers of fluted filter media 48 between support structure, such as the outer cage 52 and the inner cage 50. These cages can be made from any suitable material which is capable of supporting the fibers of fluted filter media 48 in a substantially stationary position. It is also presently preferred that the material from which cages 50 and 52 are made is inert relative to the airstream and aerosols contained therein during operation. Examples of suitable materials from which outer cage 52 and inner cage 50 can be prepared include, but are not limited to, plastic, metal, and/or mixtures thereof.

For purposes of illustration, in the fiber bed mist eliminator assembly 10, the fluted filter media 48 is further stabilized by upstanding rods 46 which extend from base plate 44 through top plate 24. This can best be seen in FIG. 2. It is also contemplated that the rods need not extend to the base of the cage. Instead, the rods can simply be welded (or otherwise attached) at or near the top of the cage. In one embodiment, the rods can be bolts or threaded studs which are welded to the inside of the cage. Various other means for stabilizing fluted filter media can be practiced within the scope of this invention and would be readily appreciated by those skilled in the art. For example, cross members can be extend across the width of filter housing 12 and engage the sides of the filter media. Still other means include the use of rods extending through top plate 24 of filter housing 12 into fluted filter media 48. In yet another embodiment, the support structure may comprise annular rings which mount to the terminal ends of the filter media. The annular rings include inner and outer concentric ring flanges which engage the inner and outer surfaces of the filter media, respectively.

Referring to FIG. 2, in operation, a contaminated gas stream, such as an aerosol-laden gas stream 72 is introduced into the fiber bed mist eliminator assembly 10 through inlet 18. As the contaminated gas passes through the fiber bed mist eliminator filter 42, the fluted fiber media 48 causes the liquid contained within the gas stream to coalesce on the walls and within the fiber media 48. The liquid eventually drains downward along the walls to the base of the fiber bed mist eliminator filter 42 where it is channeled away. The rate at which gas stream 72 flows into fiber mist eliminator assembly 10 must not cause re-entrainment of aerosols collected by fluted filter media 48. Generally, the flow rate of gas stream 72 being introduced into the fiber mist eliminator assembly 10 may range from about 1 to about 500,000 cubic feet per minute, preferably from about 5 to about 250,000 cubic feet per minute, and more preferably, from about 10 to about 100,000 cubic feet per minute.

When practicing the present invention, the velocity at which gas stream 72 flows through the fluted filter media 48 should also be less than that which results in a substantial re-entrainment of collected aerosols. The velocity of gas stream 72 through fluted filter media 48 is any rate less than about 200 feet per minute. While there is no lower limit, for practical purposes, the velocity of the gas stream passing through fluted filter media 48 should be greater than about one foot per minute. Preferably, the velocity ranges from about 10 to about 200 feet per minute, more preferably from about 20 to about 100 feet per minute, most preferably, about 30 feet per minute.

The flow rate of gas stream 72 through the fiber bed mist eliminator assembly 10 may be controlled by manipulating many different parameters. For example, if all other factors are held constant, the flow rate of a gas stream through fluted filter media 48 may be decreased by increasing the fluted fiber media 48 surface area. The surface area of fluted filter media 48 can be increased by: 1) increasing the number of fiber bed mist eliminator filters 42; or 2) increasing the size of the individual fluted filter media 48.

In an alternate embodiment (not shown) two or more fluted filter media may be concentrically mounted within a single housing, preferably with an air passage between the two filters. The contaminated flow is channeled appropriately so as to pass through at least one of the fluted filter media.

Referring to FIG. 4, an alternate embodiment of a fiber bed mist eliminator system 100 is shown. In this embodiment, a plurality of fiber bed mist eliminator filters 102 are mounted preferably in a parallel array within a single housing or vessel 104. The vessel 104 is only partially illustrated for the sake of simplicity. The vessel 104 includes one or more inlet openings 106 formed through a wall of the vessel 104. Preferably at least one inlet opening 106 is located in the vicinity of each fiber bed mist eliminator filter 102 so as to permit flow of the contaminated gas stream 108 into the fluted filter media 110. In the illustrated embodiment, there are two fiber bed mist eliminator filters 102 mounted parallel to and spaced apart from one another. The spacing is intended to permit filtered air 112 to pass between the fiber bed mist eliminator filters 102.

The fiber bed mist eliminator filters 102 include a fluted fiber media 110 contained within a support structure. In the illustrated embodiment, the support structure includes inner and outer cage or mesh members 114, 116. If desired, the support structure can be attached or engaged to the fiber media 110 by any suitable means known to those skilled in the art. A top plate 118 may be attached to the fluted filter media 110 or the support structure. In the illustrated configuration, the top plate 118 is attached to the outer cage member 116 through a ring 120 and a bolted flange 122. Various alternate mounting methods can be practiced within the purview of the claims and need not be discussed in any more detail. The attachment of the fiber bed mist eliminator filters 102 to the vessel 104 is not shown for clarity but can be made in a similar manner as discussed hereinabove with respect to the previous embodiment. Alternately, the support structure may be attached to the vessel 104.

The vessel 104 also includes an outlet port 124 which permits the combined filtered flows 112 from the fiber bed mist eliminator filters 102 to exit out of the vessel 104. Access doors 126 may be removably attached to the vessel 104 at desired locations so as to permit entry into the vessel 104 for inspecting, maintaining, and/or replacing the fiber bed mist eliminator filters 102.

The utilization of a plurality of fiber mist eliminator elements 102 within a single vessel 104 improves the overall system filtering efficiency by increasing the quantity of aerosols removed from a contaminated gas stream, such as an aerosol-laden gas stream. The added number of fiber bed mist eliminator filters 102 also increases the volumetric throughput of an the contaminated gas stream through the fiber bed mist eliminator system.

Figure 5:
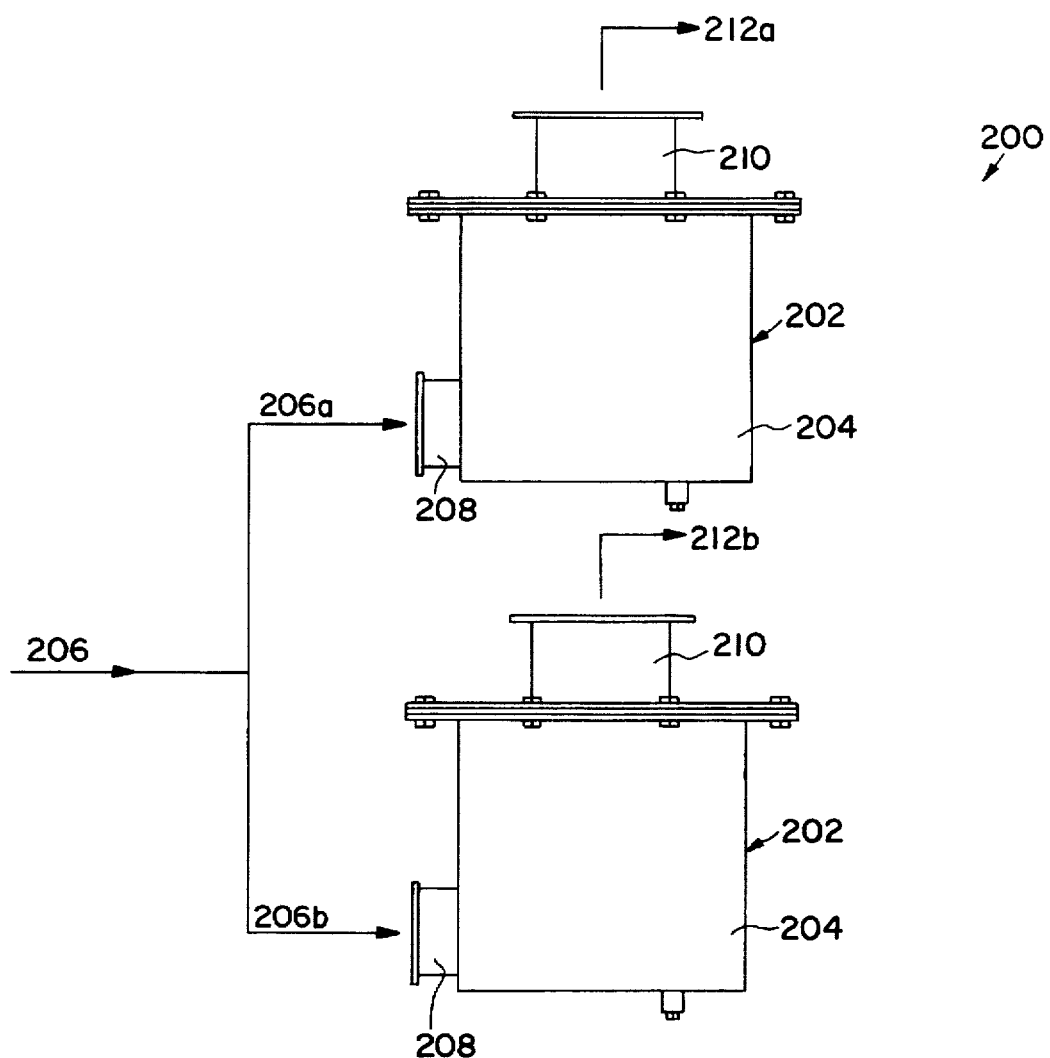

Referring now to FIG. 5, another embodiment of a fiber bed mist eliminator system 200 is shown. In this system, a pair of fiber bed mist eliminator assemblies 202 are utilized. Each assembly includes a fluted filter media contained within a support structure, such as a cage or mesh to form a fiber bed mist eliminator filter. The fiber bed mist eliminator filter is mounted within an associated housing 204 to form the assembly 102. The contaminated flow 206 is split into a plurality of individual flow paths. The number of flow paths corresponds to the number of fiber bed mist eliminator assemblies 202 in the system 200. In the illustrated embodiment, there are two fiber bed mist eliminator assemblies 202, each with an associated flow path (indicated by numerals 206a and 206b). The flow paths enter the assemblies 202 through inlet ports 208. The contaminated flows pass through the fiber bed mist eliminator filters (not shown) within the housings 204 and exit out through the outlet ports 210. The exiting flows (designated by numerals 212a and 212b) can be combined downstream from the assemblies 202 into a single treated gas flow if desired.

Figure 6:
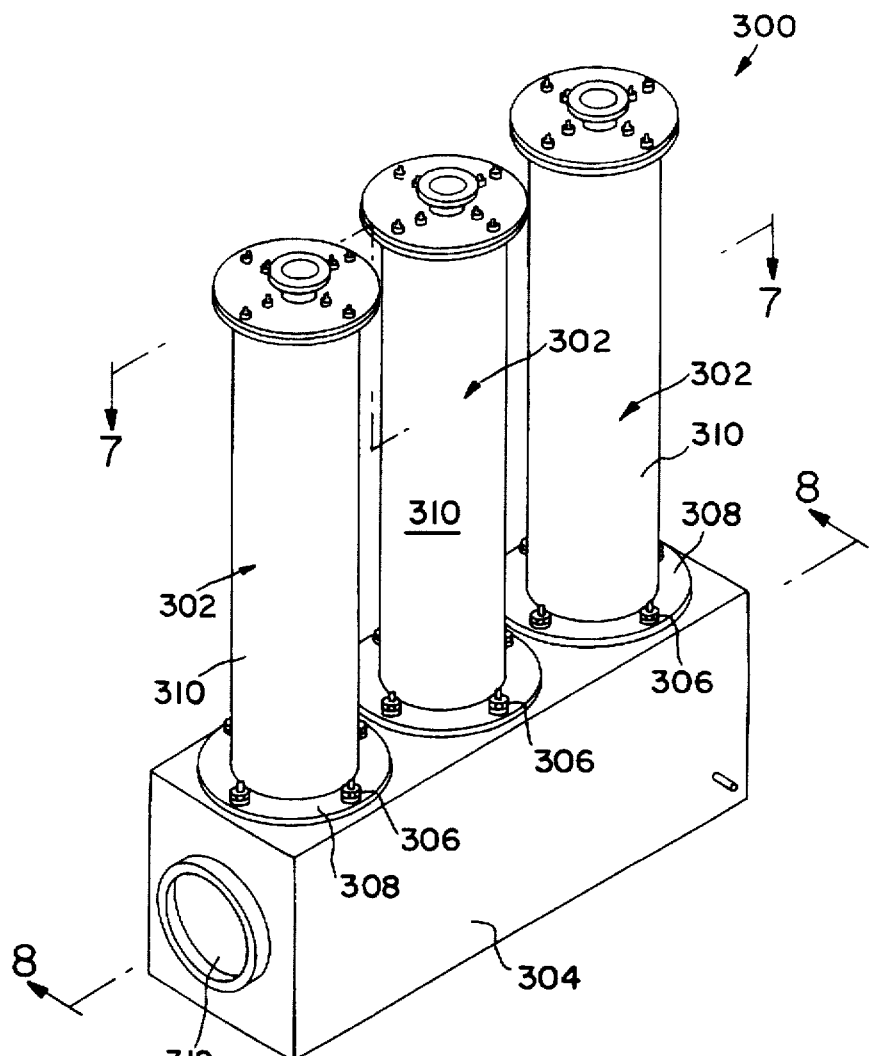
Figure 7:
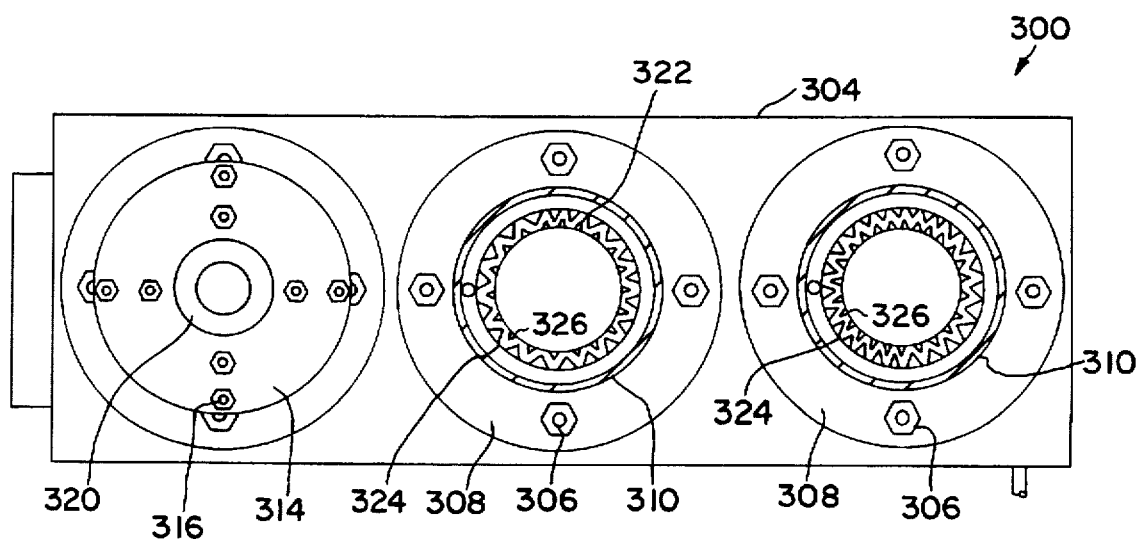
Figure 8:
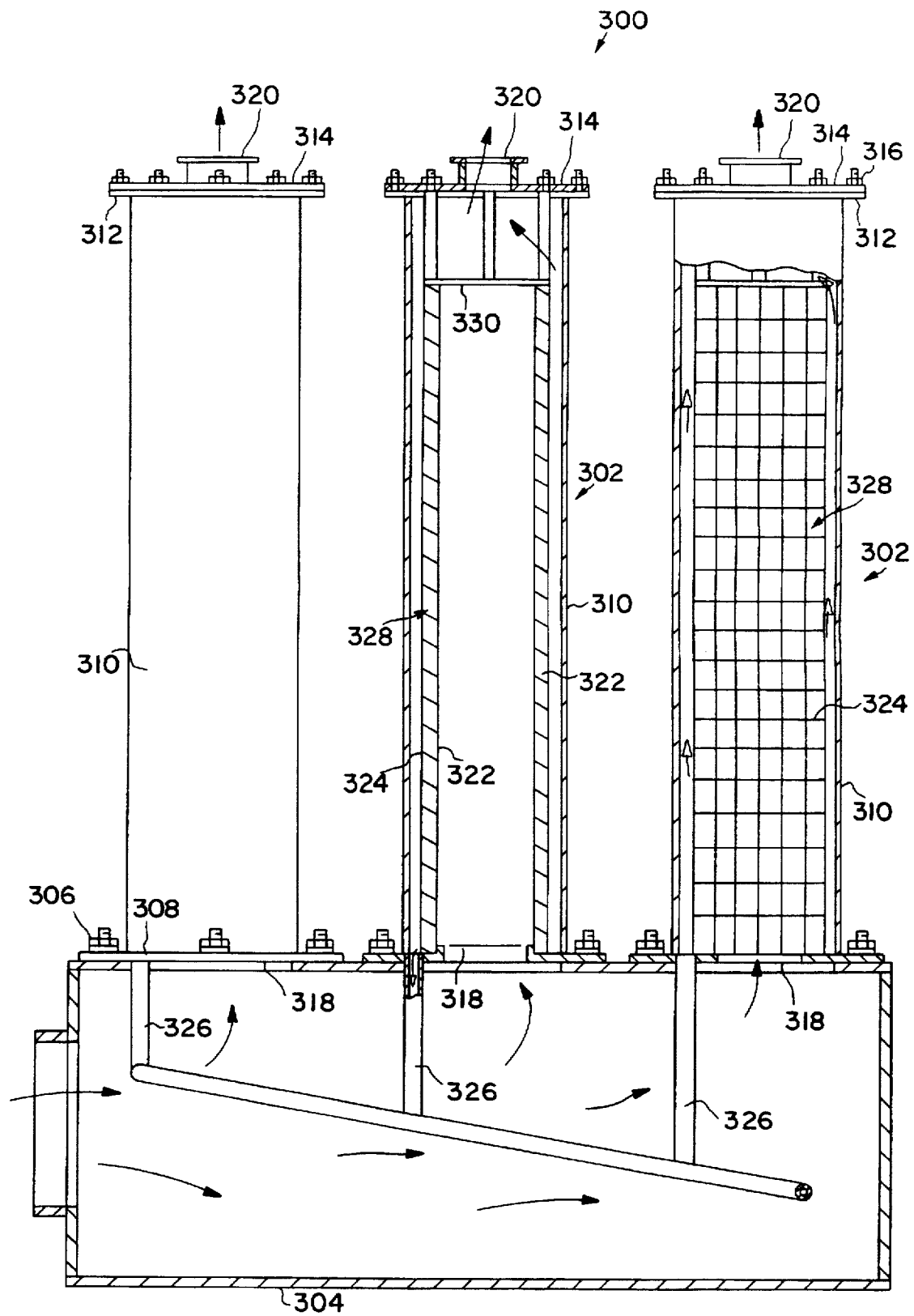

FIGS. 6 through 8 illustrate another fiber bed mist eliminator system 300. In this embodiment, a plurality of fiber mist eliminator assemblies 302 are mounted to a common drainage sump 304. The fiber bed mist assemblies 302 are shown mounted in a parallel array. Bolts 306 mount to flanges 308 formed on the housings 310 of the assemblies 302. The housings 310 include a radial upper flange 312 shown in FIG. 8. The upper flange 312 attaches to a close-out plate 314 through a bolted arrangement 316. A gasket (not shown) can be positioned between the upper flange 312 and the close-out plate 314 to prevent gas and/or liquid leakage.

Each housing 310 includes an inlet port 318 and an outlet port 320. The inlet ports 318 are in fluid communication with the interior of the drainage sump 304. The drainage sump, in turn, has an entry passage which permits a flow of a contaminated gas stream to enter the drainage sump 304 for subsequent channeling into the fiber bed mist eliminator assemblies 302.

Referring to FIGS. 7 and 8, each assembly 302 includes a fluted fiber media 322 contained within a support structure. The support structure is preferably a cage or mesh enclosure which has an outer cage 324 and an inner cage 326. The combination of the fluted fiber media 322 and the cages 324, 326 defines a fiber bed mist eliminator filter 328. A top plate 330 may be attached to the upper terminus of the fiber bed mist eliminator filter 328 by any known means. Similarly, the fiber bed mist eliminator filter 328 can be mounted within the housing 310 in any suitable manner known to those skilled in the art.

A gap is preferably formed between the fiber bed mist eliminator 328 and the inner surface of the housing 310. The gap permits the gas stream, which has been filtered by the filter media 322, to pass out of the fiber bed mist eliminator filter 328 and through the housing to the outlet port 320. The gap also permits liquid that has coalesced on and in the filter media to flow down toward the drainage sump 304. Preferably one or more sump drains 326 are formed through the walls of the drainage sump 304 and permit fluid flow between the housings 310 of the fiber bed mist eliminator assemblies 302 and the interior of the drainage sump 304. The sump drains 326 channel the collected liquid to a suitable location.

The illustrated embodiments all show cylindrical fluted filter media with a spine or longitudinal axis of the flutes being substantially parallel to a longitudinal axis of the housing or vessel. Alternate media shapes and flute configurations are also contemplated and well within the purview of this invention. For example, a flat or planar fiber bed mist eliminator filter can be formed from a substantially flat or planar piece of fluted filter media contained within a suitable support structure. This type of fiber bed mist eliminator filter would be used in a fiber bed mist eliminator system which currently utilizes flat fiber filters.

A preferred process for manufacturing the fluted filter media will now be discussed. The fluted filter media is prepared by placing a selected quantity of fiber material into an appropriately shaped mold and compressing the fiber using a hydraulic pressure. Additional fiber material may then be placed in the mold and compressed. This compression or molding step is preferably performed four or five times until the mold is filled with a desired quantity of fiber material at a desired density. The fiber material is then subjected to heat in an annealing step sufficient to "heat relax" the fibers. The fiber material is not melted or sintered. Rather, the fiber material is heated to a temperature just below its softening temperature. The most preferred pressures and temperatures are dependent on the type of fiber material employed and are readily known to those skilled in the art or easily determined by experimentation.

Generally, the selected fiber material is subjected during the molding step to a pressure up to 150 pounds per square inch, more preferably, between about 75 to 125 pounds per square inch. The fiber material is subjected to heat for a sufficient period of time to insure that the fiber material retains the shape of the mold. Suitable fiber material which may be employed when practicing the present invention include, but is not limited to, fibers of polymeric materials (e.g., polyesters, polyvinyl chloride, polyethylene, perfluoro polymers, perfluorochloro polymers, polyamides, such as Nylon 66 and Nylon 46, polypropylene, polytetrafluoroethane, polyphenylsulfide, acrylic acid polymers, and mixtures thereof), graphite, rayons, fiberglass, and mixtures thereof. The most preferred fiber material is fiberglass.

The resulting molded filter media is then placed in an annealing furnace and heated at an elevated temperature for a period of time. The preferred annealing temperature is dependent on the type of fiber material used to make the molded filter media and is readily known to those skilled in the art or can be easily determined by experimentation. The following table gives the annealing temperatures for the more preferred fibers:

| Material | Annealing Temperature Range | Preferred Annealing Temperature |
|---|---|---|
| polypropylene | 150–250° F. | 200° F. |
| polyester | 250–500° F. | 400° F. |
| fiberglass | 600–1000° F. | 850–1000° F. |

The molded filter media is annealed in the furnace for between about 1 to about 7 hours, more preferably about 4 hours.

Alternate processes can also be practiced within the scope of the claims and would be readily understood to those skilled in the art in light of the teachings described above. For example, instead of annealing the fibers, the fluted shape of the filter media can be maintained by mechanical means. In this embodiment, the support structure is configured to compress the filter media so as to maintain the desired fluted shape.

It is evident from the foregoing that various modifications can be made to the embodiments of the present invention without departing from the spirit and/or scope thereof. Having thus described the invention, it is claimed as follows.

That which is claimed is:

1. A fiber bed mist elimination process for the substantial removal of aerosols entrained in a moving gas stream, the process comprising the steps of:
   a) introducing an aerosol-laden gas stream into a fiber bed mist eliminator filter; and
   b) passing the aerosol-laden gas stream through a fluted fiber bed filter media in the fiber bed mist eliminator filter to produce a treated gas, the fiber bed filter media having a thickness greater than about one inch for removing substantially all of the entrained aerosol by diffusion as the gas stream passes through the fiber bed thickness.

2. A process according to claim 1 wherein the flow rate of said aerosol-laden gas stream into the fiber bed mist eliminator range from about 1 cubic foot per minute to about 500,000 cubic feet per minute.

3. A process according to claim 1 wherein the flow rate of said aerosol-laden gas stream into the fiber bed mist eliminator range from about 10 cubic foot per minute to about 100,000 cubic feet per minute.

4. A process according to claim 3 wherein the velocity at which said aerosol-laden gas stream passes through said fluted fiber bed filter media is less than that which results in a substantial re-entrainment of collected aerosols onto the gas stream from which said aerosols were removed.

5. A process according to claim 4 wherein the velocity at which said aerosol-laden gas stream passes through said fluted fiber bed filter media is less than about 200 feet per minute.

6. A process according to claim 4 wherein the velocity at which said aerosol-laden gas stream passes through said fluted fiber bed filter media is in a range from about 1 foot per minute to about 200 feet per minute.

7. A fiber bed mist elimination process for the substantial removal of aerosols entrained in a moving gas stream, the process comprising the steps of:
   a) dividing an aerosol-laden gas stream into at least first and second gas stream segments;
   b) passing each gas stream segment through a separate fiber bed mist eliminator filter having a fluted fiber bed filter media to form at least substantially aerosol-free first and second gas stream segments, the fiber bed filter media having a thickness greater than about one inch; and
   c) channeling the substantially aerosol-free first and second gas stream segments from the fiber bed mist eliminator filters.

8. A process according to claim 7 wherein the flow rates of said aerosol-laden gas streams into the fiber bed mist eliminator filters range from about 1 cubic foot per minute to about 500,000 cubic feet per minute.

9. A process according to claim 8 wherein the flow rates of said aerosol-laden gas streams into the fiber bed mist eliminator filters range from about 10 cubic foot per minute to about 100,000 cubic feet per minute.

10. A process according to claim 9 wherein the velocities at which the aerosol-laden gas streams pass through the fluted fiber bed filter media are less than that which results in a substantial re-entrainment of collected aerosols onto the gas streams from which said aerosols were removed.

11. A process according to claim 10 wherein the velocities at which the aerosol-laden gas streams pass through the fluted fiber bed filter media are less than about 200 feet per minute.

12. A process according to claim 10 wherein the velocities at which the aerosol-laden gas streams pass through the fluted fiber bed filter media are in a range from about 1 foot per minute to about 200 feet per minute.

13. A process according to claim 7 further comprising the step of channeling the aerosol-laden gas stream into a vessel prior to the step of dividing the aerosol-laden gas stream into segments; and wherein the step of passing each gas stream segment through a separate fiber bed mist eliminator filter occurs within the vessel.

14. A process according to claim 7 wherein each fiber bed mist eliminator filter is contained within a separate housing.

15. A process according to claim 7 wherein the fiber bed mist eliminator filters are contained within a common housing.

16. A fiber bed mist elimination process for the substantial removal of aerosols entrained in a moving gas stream, the process comprising the steps of:

introducing an aerosol-laden gas stream into a drainage sump;

channeling at least a portion of the aerosol-laden gas stream within the drainage sump into a fiber bed mist eliminator filter, the fiber mist eliminator filter including a fluted fiber bed filter media having a thickness greater than about one inch;

passing the aerosol-laden gas stream through the thickness of the fluted fiber bed filter media to remove the aerosol from the gas stream primarily by diffusion so as to produce a treated gas stream;

channeling the treated gas stream out of the fiber bed mist eliminator filter; and channeling the removed aerosol from the fiber bed mist eliminator filter into the drainage sump.

17. A process according to claim 16 wherein the flow rates of the aerosol-laden gas stream into the fiber bed mist eliminator filter ranges from about 1 cubic foot per minute to about 500,000 cubic feet per minute.

18. A process according to claim 17 wherein the flow rate of the aerosol-laden gas stream into the fiber bed mist eliminator filter ranges from about 10 cubic foot per minute to about 100,000 cubic feet per minute.

19. A process according to claim 16 wherein the velocity at which the aerosol-laden gas stream passes through the fluted fiber bed filter media is less than that which results in a substantial re-entrainment of collected aerosols onto the gas stream which the aerosols were removed.

20. A process according to claim 19 wherein the velocity at which the aerosol-laden gas stream passes through the fluted fiber bed filter media is less than about 200 feet per minute.

21. A process as defined in claim 16 wherein the velocity at which the aerosol-laden gas stream passes through the fluted fiber bed filter media is in the range from about 1 foot per minute to about 200 feet per minute.

22. A fiber bed mist eliminator useful for the removal of aerosols of less than 3 microns from a moving gas stream, the fiber bed mist eliminator comprising:

a) a filter vessel having an inlet and an outlet, the inlet adapted to channel an aerosol-laden gas stream into the vessel, the outlet adapted to channel a substantially aerosol-free gas stream out of the vessel, the vessel adapted to channel a gas stream flow from the inlet to the outlet; and b) a fluted fiber bed filter media contained within the enclosed filter vessel and positioned between the inlet and the outlet within the flow of the gas stream, the fluted fiber bed filter media having a thickness greater than about 1 inch and adapted to remove aerosols of less than 3 microns from the flow of the gas stream.

23. A fiber bed mist eliminator according to claim 22 further comprising a support structure for containing the fluted fiber bed filter media, and wherein the fluted fiber bed filter media comprises randomly-distributed fibers.

24. A fiber bed mist eliminator according to claim 23 wherein the support structure includes inner and outer cages.

25. A fiber bed mist eliminator according to claim 24 wherein the inner and outer cages comprise materials which are substantially inert to the gas stream and the aerosol entrained therein.

26. A fiber bed mist eliminator according to claim 24 further comprising at least one rod attached to the inner cage and extending upward, the vessel having a top plate for enclosing the fluted filter media within the vessel, the rod extending through the top plate and out of the vessel, and a fastener attached to the rod and secures the rod to the top plate.

27. A fiber bed mist eliminator according to claim 23 wherein said fibers have a mean diameter in the range from about 2 microns to about 50 microns.

28. A fiber bed mist eliminator according to claim 23 wherein said fibers comprise materials selected from the group consisting of polymeric compounds, fiberglass, graphite, rayons, and mixtures thereof.

29. A fiber bed mist eliminator according to claim 28 wherein said polymeric compounds comprise at least one compound selected from the group consisting of polyesters, polyvinyl chloride, polyethylene, perfluoro polymers, perfluorochloro polymers, polyamides, polypropylene, polytetrafluoroethane, polyphenylsulfide, acrylic acid polymers, and mixtures thereof.

30. A fiber bed mist eliminator according to claim 22 further comprising a second fluted fiber bed filter media contained within the filter vessel, and wherein the vessel is adapted to channel a portion of the flow through each fluted fiber bed filter media.

31. A fiber bed mist eliminator according to claim 22 wherein the fluted fiber bed filter media comprises a plurality of flutes forming a continuous, substantially corrugated shape.

32. A fiber bed mist eliminator according to claim 31 wherein the continuous, substantially corrugated shape is cylindrical.

33. A fiber bed mist eliminator according to claim 31 wherein the continuous, substantially corrugated shape defines a substantially flat plane.

34. A fiber bed mist eliminator according to claim 31 wherein each flute defines an internal angle between about 15° and about 60°.

35. A fiber bed mist eliminator according to claim 34 wherein the internal angle is between about 25° and about 45°.

36. A fiber bed mist eliminator according to claim 35 wherein the internal angle is about 30°.

37. A fiber bed mist eliminator useful for the removal of aerosols of less than 3 microns from a moving gas stream, the fiber bed mist eliminator comprising:

a) a filter vessel having an inlet and an outlet, the inlet adapted to channel an aerosol-laden gas stream into the vessel, the outlet adapted to channel a substantially aerosol-free gas stream out of the vessel, the vessel adapted to channel a gas stream flow from the inlet to the outlet; and b) a fluted fiber bed filter media contained within the enclosed filter vessel and positioned between the inlet and the outlet within the flow of the gas stream, the fluted fiber bed filter media having a thickness greater than about 1 inch and adapted to remove aerosols of less than 3 microns from the flow of the gas stream, wherein the fluted fiber bed filter media is annealed.

38. A fiber bed mist eliminator system comprising:

a) a first fiber bed mist eliminator filter for filtering an aerosol-laden gas stream including a first fluted fiber bed filter media having a thickness greater than about one inch contained within a support structure;

b) a second fiber bed mist eliminator filter for filtering an aerosol-laden gas stream including a second fluted fiber bed filter media having a thickness greater than about one inch contained with a support structure; and c) a vessel for housing the first and second fiber bed mist eliminator filters, the vessel having an inlet port and an outlet port, the ports being in fluid communication with one another and adapted to permit ingress and egress of a gas stream, respectively, the first and second fiber bed mist eliminator filters being positioned between the inlet and outlet ports, the filtering of the aerosol from the gas stream occurring primarily by diffusion into the fiber beds.

39. A fiber bed mist eliminator system as defined in claim 38 wherein the fluted fiber bed filter media comprises randomly-distributed fibers, and wherein the support structure includes an outer cage and an inner cage.

40. A fiber bed mist eliminator system as defined in claim 39 wherein said fibers have a mean diameter in the range from about 2 microns to about 50 microns.

41. A fiber bed mist eliminator system comprising:

a first fiber bed mist eliminator assembly including a first fluted fiber bed filter media contained within a support structure, and a first housing for enclosing the first fluted filter media and support structure, the first fluted fiber bed filter media having a thickness greater than about one inch and adapted to filter an aerosol-laden gas stream;

a second fiber bed mist eliminator assembly including a second fluted fiber bed filter media contained within a support structure, and a second housing for enclosing the second fluted filter media and support structure, the second fluted fiber bed filter media having a thickness greater than about one inch and adapted to filter an aerosol-laden gas stream;

means for receiving a flow of aerosol-laden gas;

means for channeling a portion of the aerosol-laden gas into each assembly; and means for dispensing a substantially aerosol-free gas from the assemblies.

42. A fiber bed mist eliminator system according to claim 41 wherein the first and second fluted fiber bed filter media comprise randomly-distributed fibers, and wherein each associated support structure comprises an outer cage and an inner cage.

43. A fiber bed mist eliminator system as defined in claim 42 wherein said fibers have a mean diameter in the range from about 2 microns to about 50 microns.

44. A fiber bed mist eliminator system for removing aerosols from an untreated gas flow, the system comprising:

a container having an inlet passage adapted for receiving a flow of untreated gas; and at least one fiber bed mist eliminator filter mounted to the container and having an opening adapted to permit passage of the untreated gas flow from the container into the at least one fiber bed mist eliminator filter, the at least one fiber bed mist eliminator filter including a fluted fiber bed filter media and a support structure for supporting the fluted filter media, the fluted fiber bed filter media having a thickness greater than about one inch and adapted to treat the gas flow by removing entrained aerosols primarily by diffusion, the at least one fiber bed mist eliminator filter adapted to permit passage of a treated gas flow out of the at least one fiber bed mist eliminator filter.

45. A fiber bed mist eliminator system according to claim 44 further comprising means for channeling a liquid flow of removed contaminants from the at least one fiber bed mist eliminator filter into the container.

46. A fiber bed mist eliminator system according to claim 44 further comprising a housing disposed about the at least one fiber bed mist eliminator filter and attached to the container.

47. A fiber bed mist eliminator filter for removing aerosols from an untreated gas flow, the fiber bed eliminator filter adapted to be located within a vessel which has an aerosol-laden gas stream passing therethrough, the filter comprising:

a fluted fiber bed filter media having a thickness greater than about one inch and fiber structure sufficient to treat the gas stream by removing substantially all of the entrained aerosol by diffusion as the gas stream passes through the fiber bed thickness; and a support structure disposed about at least a portion of the fluted fiber bed filter media, the support structure for supporting the fluted fiber bed filter media, the support structure adapted for mounting to the vessel.

* * * * *

UNITED STATES PATENT AND TRADEMARK OFFICE
CERTIFICATE OF CORRECTION

PATENT NO. : 5,795,369
DATED      : August 18, 1998
INVENTOR(S): Steven I. Taub

It is certified that error appears in the above-identified patent and that said Letters Patent is hereby corrected as shown below:

On the face sheet at item [75] "Inventor:", change "Steven L. Taub" to "Steven I. Taub".

Signed and Sealed this

Twenty-third Day of February, 1999

Attest:

Q. TODD DICKINSON

Attesting Officer

Acting Commissioner of Patents and Trademarks